United States Patent
Roessle

(10) Patent No.: US 12,331,582 B2
(45) Date of Patent: Jun. 17, 2025

(54) COVER PART WITH INTEGRATED IMPACT BUFFER AND MANUFACTURE THEREOF

(71) Applicant: BBP Kunststoffwerk Marbach Baier GmbH, Marbach (DE)

(72) Inventor: Jürgen Roessle, Affalterbach (DE)

(73) Assignee: BBP Kunststoffwerk Marbach Baier GmbH, Marbach (DE)

( * ) Notice: Subject to any disclaimer, the term of this patent is extended or adjusted under 35 U.S.C. 154(b) by 387 days.

(21) Appl. No.: 18/072,008

(22) Filed: Nov. 30, 2022

(65) Prior Publication Data

US 2023/0175299 A1 Jun. 8, 2023

(30) Foreign Application Priority Data

Dec. 2, 2021 (DE) .................. 10 2021 131 818.1

(51) Int. Cl.
| | |
|---|---|
| *E05F 5/06* | (2006.01) |
| *B29C 45/14* | (2006.01) |
| *E05F 5/02* | (2006.01) |
| *B29L 31/30* | (2006.01) |

(52) U.S. Cl.
CPC .......... *E05F 5/06* (2013.01); *B29C 45/14065* (2013.01); *E05F 5/022* (2013.01); *B29L 2031/3005* (2013.01); *E05Y 2201/224* (2013.01); *E05Y 2900/536* (2013.01); *E05Y 2900/548* (2013.01)

(58) Field of Classification Search
CPC ... E05F 5/02; E05F 5/022; E05F 5/025; E05F 5/06; E05F 2201/224

USPC .................. 296/207; 16/82, 86 R, 86 A, 86 B
See application file for complete search history.

(56) References Cited

U.S. PATENT DOCUMENTS

| | | | | |
|---|---|---|---|---|
| 7,878,578 | B2* | 2/2011 | Iwai | B60R 21/34 296/193.11 |
| 9,272,735 | B2* | 3/2016 | Iwano | E05F 5/022 |
| 2009/0117398 | A1 | 5/2009 | Helmstetter et al. | |
| 2009/0167060 | A1* | 7/2009 | Zanolin | B62D 25/105 296/193.11 |

(Continued)

FOREIGN PATENT DOCUMENTS

| | | |
|---|---|---|
| DE | 19706734 A1 | 8/1998 |
| DE | 102007052849 A1 | 5/2009 |

(Continued)

*Primary Examiner* — Dennis H Pedder
(74) *Attorney, Agent, or Firm* — Jason H. Vick; Amped IP LLC

(57) ABSTRACT

An integrally formed cover part for a vehicle comprises a basic component and a soft component. The basic component is at least sectionally flat and made of a thermoplastic material. The soft component is firmly connected to the basic component and made of a thermoplastic elastomer. The basic component comprises a front side and a back side. The soft component forms at least one buffer that is an impact buffer, which is configured as a double buffer including a front buffer arranged on the front side and a rear buffer arranged on the back side. The basic component has an elevated support profile extending on the back side. The soft component forms a support surface on the front side, which is part of the front buffer. The soft component extends along the support profile towards the back side. The soft component forms a contact surface on the back side, which is part of the rear buffer.

15 Claims, 8 Drawing Sheets

(56) References Cited

U.S. PATENT DOCUMENTS

2009/0235486 A1  9/2009  Rosemann et al.

FOREIGN PATENT DOCUMENTS

DE  102018007862 A1  4/2020
EP      1338399 A1  8/2003

* cited by examiner

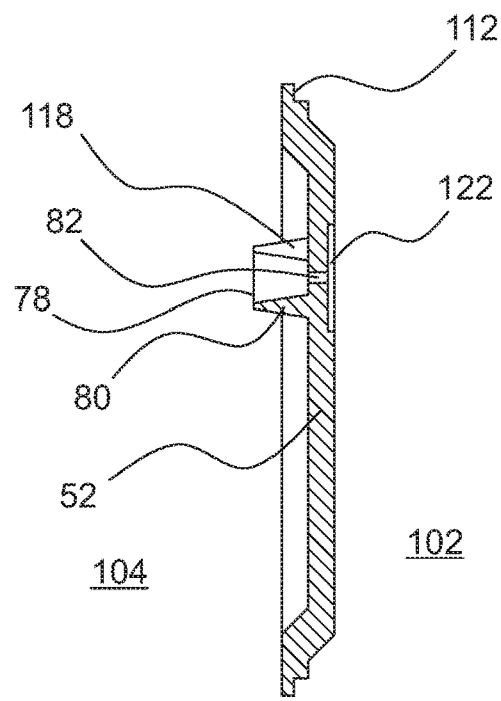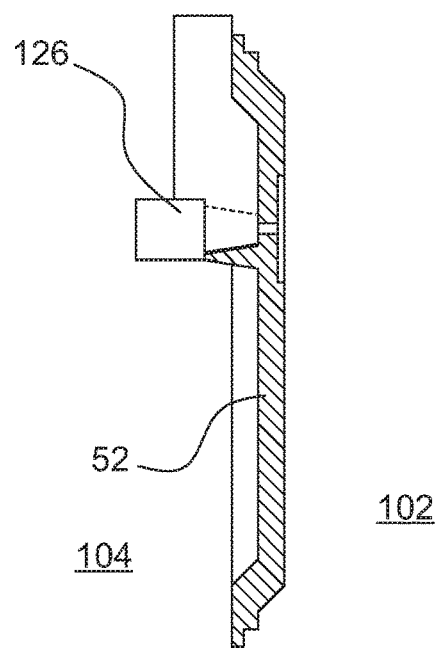
Fig. 12          Fig. 13
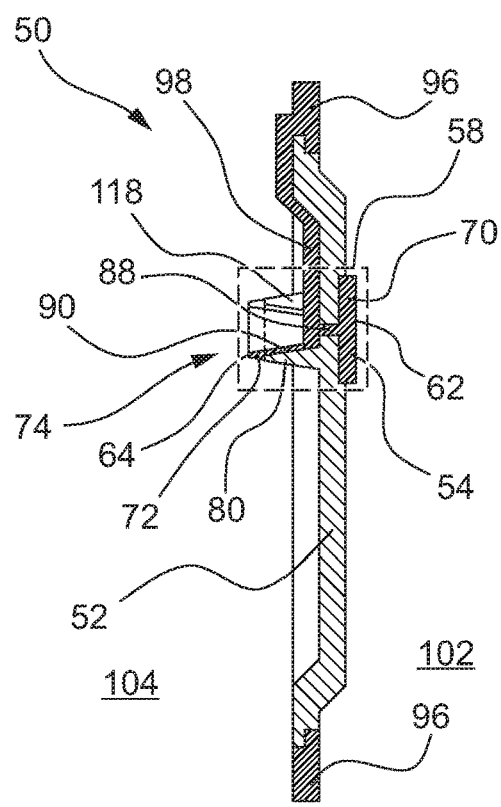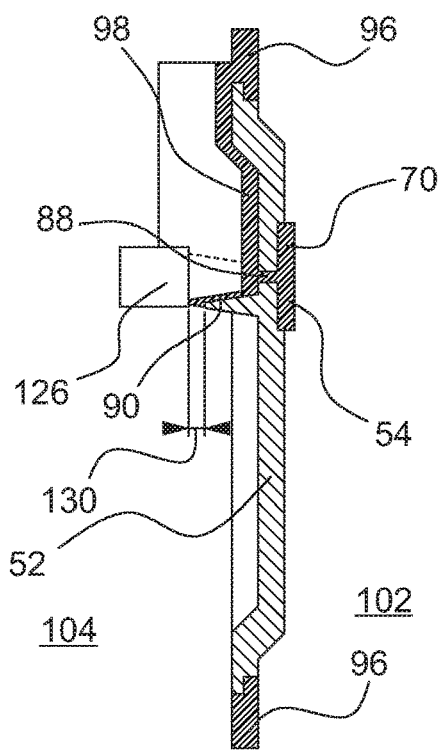
Fig. 14          Fig. 15

COVER PART WITH INTEGRATED IMPACT BUFFER AND MANUFACTURE THEREOF

CROSS-REFERENCE TO RELATED APPLICATIONS

This application claims priority to German patent application 10 2021 131 818.1, filed on Dec. 2, 2021. The entire content of this priority application is incorporated herein by reference.

BACKGROUND

The present disclosure relates to a cover part with an integrated impact buffer. In certain embodiments, the present disclosure relates to such a cover part for a vehicle. In addition, the present disclosure relates to a vehicle that is provided with such a cover part. The present disclosure further relates to a method of manufacturing a cover part for a vehicle. In certain embodiments this relates to the production of a cover part with an integrated impact buffer.

Cover parts, in particular those made of a thermoplastic material, are used in a variety of ways in vehicles. Vehicles usually have one or more flaps that are designed as part of the body or articulated to the body. The flaps may be, for example, hoods, doors, cargo bay doors, and the like. When opening and closing such flaps, high forces and impacts often occur. Therefore, care must be taken to ensure that components involved can withstand both normal operating conditions and severe operating conditions (misuse), preferably with little or no damage.

It is therefore common to secure movements of flaps relative to fixed components of a car body with buffers, seals and the like. In this way, direct contact with hard and potentially damaging components can be minimized or avoided.

In addition, care must be taken to ensure that tolerances, gap sizes and the like are within a desired range. Also against this background, it is desirable to absorb movements of flaps of vehicles by means of buffers and the like. In this way, it is possible to adjust the relative position of the components involved in the closed state. Buffers can be generally made of elastomeric materials (natural rubber, synthetic rubber and the like), but also of other materials that are suitable for wear protection and as force limiters.

US 2009/0235486 A1 discloses an arrangement having an adjustable impact buffer for a flap of a vehicle. It is proposed to combine a buffer element with an impact component. In this way, on the one hand, forces can be absorbed, and on the other hand, for example, a gap size between the flap and the rest of the body of the vehicle can be optimized.

Buffers, impact buffers and the like are often designed as individual parts that have to be mounted on a support part (basic component). This often involves a certain amount of effort. This is particularly the case for buffers made of elastomer materials. For example, the form-fit assembly of such buffers presents some challenges, and this also applies to automated assembly.

If, for example, separate impact buffers and the like are not used for cost reasons, there is often a risk of damage to the components involved in the event of misuse (e.g., slamming the flap with high force). Misuse may be attributed to the user. However, there may also be technical causes for misuse, for example the failure of mechatronic locking systems or closing aids.

In view of this, it is an object of the present disclosure to present a cover part for a vehicle, which has, in addition to a basic component, a soft component, which is suitable as a buffer.

It is a further object of the present disclosure to present a cover part for a vehicle, wherein the cover part can be produced with little effort, and wherein the assembly effort is reduced, at least in certain embodiments.

It is a further object of the present disclosure to present a cover part for a vehicle, wherein the cover part shall be suitable for use with vehicles, whereby a stop is provided for closing flaps of the vehicle.

It is a further object of the present disclosure to present a cover part for a vehicle, which reduces, in the event of misuse, the likelihood of damage. In certain embodiments, this concerns the cover part itself as well as adjacent components.

It is a further object of the present disclosure to present a cover part for a vehicle, which involves an integral, valuable design.

It is a further object of the present disclosure to present a cover part for a vehicle, which can be produced in a single cycle.

It is a further object of the present disclosure to present a vehicle that is equipped with such a cover part.

a further object of the present disclosure to present a method of manufacturing a cover part with an integrated buffer for a vehicle.

SUMMARY

According to a first aspect, these and other objects are achieved by a cover part for a vehicle, comprising:
a basic component at least sectionally flat and made of a thermoplastic material, and
a soft component made of a thermoplastic elastomer, which is firmly connected to the basic component,
wherein the basic component comprises a front side and a back side,
wherein the soft component forms at least one buffer that is an impact buffer, which is configured as a double buffer including a front buffer arranged on the front side and a rear buffer arranged on the back side,
wherein the basic component has an elevated support profile extending on the back side,
wherein the soft component forms a support surface on the front side, which is part of the front buffer,
wherein the soft component extends along the support profile towards the back side, and
wherein the soft component forms a contact surface on the back side, which is part of the rear buffer.

According to another aspect, the above and other objects are achieved by a vehicle having a cover part,
wherein the cover part is integrally formed and comprises:
a basic component at least sectionally flat and made of a thermoplastic material, and
a soft component made of a thermoplastic elastomer, which is firmly connected to the basic component,
wherein the basic component comprises a front side and a back side,
wherein the soft component forms at least one buffer that is an impact buffer, which is configured as a double buffer including a front buffer arranged on the front side and a rear buffer arranged on the back side,
wherein the basic component has an elevated support profile extending on the back side, wherein the soft component forms a support surface on the front side, which is part of the front buffer, wherein the soft component extends along the support profile towards the back side, wherein the soft component forms a contact surface on the back side, which is part of the rear buffer, wherein the cover part is arranged between a fixed body component and a flap of the vehicle, wherein the buffer is configured to absorb forces when the flap is closed, wherein the rear buffer faces the fixed body component that is provided on the body side, and wherein the front buffer faces the flap.

According to another aspect, the above and other objects are achieved by a method of manufacturing a cover part with an integrated buffer for a vehicle, the method comprising the steps of:

providing a mold for 2K injection molding, formation of a basic component from a thermoplastic material by injection molding in a first cavity provided by the mold, wherein the basic component has an elevated support profile extending on the back side, preparing a further injection molding step in the mold, comprising:

moving a core that is associated with the movable mold part to form the second cavity for the soft component, wherein, during the preparation of the further injection molding step, a stroke of the core in the second cavity forms a first connection and a second connection between the nozzle-side molding nest for the soft component and the molding nest of the movable mold part to form a buffer region and a sealing lip, wherein the first connection extends through a passage opening of the basic component to form the buffer area, and wherein the second connection is formed on the back side of the base component by a channel to form the sealing lip, and formation of the soft component that is firmly connected to the basic component by injection molding in a second cavity provided by the mold, wherein the soft component forms at least one buffer that is an impact buffer, which is configured as a double buffer including a front buffer arranged on the front side and a rear buffer arranged on the back side, wherein the soft component forms the sealing lip, which extends at least sectionally along a perimeter of the basic component, wherein the soft component forms on the back side the second connection between the sealing lip and the rear buffer, wherein the basic component has an elevated support profile extending on the back side, wherein the soft component forms a support surface on the front side, which is part of the front buffer, wherein the soft component extends along the support profile towards the back side, and wherein the soft component forms a contact surface on the back side, which is part of the rear buffer.

According to another aspect, the above and other objects are achieved by a cover part for a vehicle, the cover part comprising:

a basic component at least sectionally areally extending and made of a thermoplastic material, wherein the basic component comprises a front side and a back side, and a soft component made of a thermoplastic elastomer, which is firmly bonded to the basic component, wherein the basic component has an elevated support profile extending on the back side, wherein the soft component forms a support surface on the front side and extends along the support profile towards the back side, and wherein the soft component forms a contact surface on the back side, which faces a base provided on the body-side.

The cover part can be designed as an integrally formed component with two components. By way of example, the basic component is made of a thermoplastic material. For example, it is a polyolefin, for instance polypropylene (PP), polyamide (PA) or a comparable material. Reinforcements or other additives are also conceivable. Glass fibers (GF) can be used as an example. In principle, reinforcement with talc (TV) is also conceivable. In this way, use properties and processability can be favorably influenced.

The soft component is made of a thermoplastic elastomer. In this way, the soft component can be processed by injection molding. In contrast to rubber, there is no need for vulcanization. This simplifies production. Despite the integral design with two components, the cover part is basically suitable for automated production with high quantities. In an exemplary arrangement, the cover part can be formed by injection molding in a combined cycle based on two materials.

The front side is, for example, a visible side, especially when the flap is open. The back side is, for example, a side facing the components to be covered. Generally, this assignment also applies to the cover part (trim part) as a whole. Generally, the terms front side and back side are not to be understood in a limiting sense. In an exemplary arrangement, in an injection mold the front side faces the nozzle side, whereas the back side faces an ejector side. This is not to be understood to be limiting.

According to another aspect, the above and other objects are achieved by a method of manufacturing a cover part for a vehicle, the method comprising the following steps:

providing a mold for 2K injection molding, forming a basic component from a thermoplastic material by injection molding in a first cavity provided by the mold, preparing a further injection molding step in the mold, and forming a soft component firmly bonded to the basic component by injection molding in a second cavity provided by the mold, wherein the basic component has an elevated support profile that extends on the back side, wherein the soft component forms a support surface on the front side and extends along the support profile towards the back side, and wherein the soft component forms a contact surface on the back side, which particularly faces a base that is provided on the body-side.

The method is suitable for producing a cover part according to at least one of the embodiments mentioned herein. It is understood that the method and the cover part may be equally arranged and further developed.

In certain embodiments, the soft component comprises a thermoplastic elastomer. In an exemplary arrangement, the soft component consists of a thermoplastic elastomer. In certain embodiments, the basic component comprises a thermoplastic resin. In an exemplary arrangement, the basic component consists of a thermoplastic resin.

In an exemplary arrangement, one and the same mold part is used for providing the first cavity and the second cavity, at least sectionally. In this way, components made of multiple materials can be formed in a combined cycle. This is referred to, for example, as multi-component injection molding. In this way, materials with favorable properties can be combined to form the basic component and the soft component and to join them firmly together already during fabrication, for example in a material-to-material bond.

In an exemplary arrangement of the cover part or the method, the basic component and the soft component are integrally manufactured using a 2K process. A 2K process is suitable for manufacturing components consisting of two different materials. For example, this involves two different materials (plastics) that can be formed by injection molding in a combined cycle. The cycle may comprise a transfer of the part (semi-finished product) between a first operation and a second operation.

Established technologies for components obtained by means of 2K processes, which are suitable as cover parts are, for example, the so-called transfer technique, the turning technique or displacement technique, and the core retraction technique. In an exemplary arrangement, the cover part is produced using at least one of these approaches. In the transfer technique, the so-called pre-molded part is removed from the first cavity after the first injection process by means of handling technology and transferred to a second cavity. In certain embodiments, in the turning technique or displacement technique, the mold, or a movable mold half, is brought into a new position, in which it forms a new cavity for the second injection process together with another mold half. The movable mold half is thus part of the first cavity and the second cavity. In the core retraction technique, a core is moved in the mold between the first injection process and the second injection process to provide space for the second component.

In an exemplary arrangement of the cover part or the method, the soft component forms at least one buffer configured to absorb forces when closing a flap. In other words, the soft component forms a buffer region that is adjacent to or otherwise associated with the support profile of the basic component. For example, the flap may, be a door, hood or a similar flap of a vehicle. It is conceivable to form the soft component as a double buffer, so that a buffer function is provided both on the front side and on the back side. In this way, for example, a rear buffer can serve as a rear stop if, due to a load on the front side of the cover part, the cover part is deformed towards the back side. In this way, excessive deformation and possible damage to a body-side base of the cover part can be minimized or avoided.

In an exemplary arrangement of the cover part or the method, the soft component on the front side forms a front buffer, which is contacted by an opposite impact component in a load condition. It is conceivable to arrange the cover part on a fixed body component of the vehicle. In such a case, the opposite impact component is arranged on a movable flap of the vehicle. When the flap is closed and high forces may be applied, contact may occur between the impact component and the front buffer of the cover part. However, it is also conceivable to arrange the cover part on a movable body component (on the flap itself). In such a case, the opposite impact component is arranged on a fixed body component of the vehicle. Also in this way, contact between the impact component and the front buffer of the cover part can occur when the flap is closed and high forces may be applied.

In an exemplary arrangement of the cover part or of the method, the soft component is deflected with its contact surface towards a base provided on the body-side, at least in the case of a limit load on the front buffer. In the case of a high load, the soft component can contact a base that is provided on the body-side. In this way, potentially occurring forces can be accommodated.

A limit load is, for example, the exceeding of a load limit for a normal load. In the case of a vehicle flap, a limit load occurs, for example, in the event of improper use, when the flap is slammed with high force. Similarly, a limit load may occur if the originally intended dampers for the closing movement fail or are deactivated.

In an exemplary arrangement of the cover part or the method, the contact surface is part of a rear buffer that is arranged on the back side. In other words, the soft component may also form a buffer on the back side.

In an exemplary arrangement of the cover part or the method, the soft component forms a double buffer, i.e., both a buffer on the front side and a buffer on the back side. Due to the integral design, the assembly of a front buffer as well as the assembly of a rear buffer can be dispensed with in this way. In an exemplary arrangement, the soft component forms a connection between the front buffer and the rear buffer so that material can flow between corresponding recesses in the molding nest during manufacture.

In an exemplary arrangement of the cover part or the method, the soft component further forms a sealing lip at least sectionally extending along a perimeter of the basic component. In other words, the soft component may perform further functions.

In an exemplary arrangement of the cover part or the method, the soft component on the back side of the basic component forms a connection between the sealing lip and the contact surface. This facilitates the flow of the material during manufacturing. In an exemplary arrangement, the soft component forms a connection between the buffer area and the sealing lip so that material can flow between corresponding recesses in the molding nest during manufacturing.

In an exemplary arrangement of the cover part or the method, the support profile has a plurality of interconnected supporting walls, which extend from the basic component towards the back side. In certain embodiments, the support profile is demoldable in a main demolding direction. In this way, also the basic component and the entire cover part can be stiffened in a direction transverse to an areal main extension. This is suitable, for example, for arrangements, in which there is a certain gap between a flat section of the cover part and a body-side base.

In an exemplary arrangement, the support profile with the supporting walls is demoldable in a main demolding direction. The support profile can serve as a stiffening profile in case of high loads when closing the flap. The support profile typically extends on the back side of the basic component. Furthermore, the support profile can serve as a support for the soft component, which forms at least one contact surface on the back side of the basic component, and optionally also a rear buffer. The soft component is firmly connected on the back side of the basic component to the support profile, for instance to its supporting walls.

In an exemplary arrangement of the cover part or the method, the interconnected supporting walls form an open support profile that extends from the basic component towards the back side. By way of example, this is a laterally open profile. In this way, the soft component can extend between an interior space of the support profile and the surroundings of the support profile on the back side of the cover part. The lateral gap or recess in the support profile may, for example, serve to connect a sealing lip and the rear buffer of the soft component.

In an exemplary arrangement of the cover part or the method, the support profile has a slot-like opening, through which the soft component extends. In this way, a connection between the interior of the support profile and an outer sealing lip can be formed.

In an exemplary arrangement of the cover part or the method, the soft component extends at least sectionally within the support profile, wherein the soft component at least sectionally forms a rear termination of the supporting walls to form the contact surface. In this way, by way of example, the rear buffer may be configured as a rear termination of the supporting walls of the support profile. Thus, the rear buffer can bridge any residual distance between the support profile and a body-side base. There, the buffer provides a certain degree of flexibility for the cover part. This avoids load peaks when high forces are applied to the cover part towards the base on the body-side. Nevertheless, the cover part can be sufficiently rigid in the area of the support profile, wherein the relatively rigid basic component also has a certain height extension due to the support profile.

In an exemplary arrangement of the cover part or the method, the soft component on the back side extends at least sectionally outside the support profile. Thus, a connection to the sealing lip can be formed. Furthermore, the soft component can cover the support profile from the outside, at least sectionally. This can be favorable for the bonding between the soft profile and the basic component in the area of the back contact surface.

In an exemplary arrangement of the cover part or the method, at least one of the supporting walls has a section with increased inclination. This involves an inclination relative to the main demolding direction in this area. A certain demolding inclination (for example 1.5°, 2° or 3°) is generally provided. However, if at least in sections with increased inclination (e.g., 10°, 15° or 20°) a greater inclination relative to the demolding direction is provided, this allows the formation of sufficiently thick wall thicknesses of the soft component when using a retractable core. In this way, the flowability of the soft component is ensured during production.

The at least one section with increased inclination can, for example, be formed as a back profile on one of the supporting walls, for instance on an inner side of the support profile. For example, an inclination of 15° with a stroke of the core of 3 mm already allows sufficiently high wall thicknesses.

In an exemplary arrangement of the cover part or the method, the basic component comprises at least one passage opening between the front side and the back side, through which the soft component extends for connecting the support surface and the contact surface. In certain embodiments, the passage opening is arranged under the front-side support surface of the soft component.

In this way, a connection is formed between the front side and the back side, through which the material of the soft component can flow during manufacture. In certain embodiments, this may have the effect that no sprue is required on both the front side as well as the back side. Instead, it is sufficient to form a sprue on only one of the two sides. The material can still form a buffer-like design on both sides. In the final state, the passage opening is filled with the soft component. The passage opening sits inside the support profile.

In an exemplary arrangement of the cover part or the method, the step of providing the mold comprises providing at least one nozzle-side molding nest for the basic component and providing at least one nozzle-side molding nest for the soft component, wherein a movable mold part is provided having a molding nest that faces the nozzle-side molding nest of the basic component during the formation of the basic component and that faces the nozzle-side molding nest of the soft component during the formation of the soft component.

For example, the mold is a so-called rotary mold with a rotatable mold part, which forms both a part of the cavity for the production of the basic component and a part of the cavity for the production of the soft component.

In an exemplary arrangement of the cover part or the method, the step of preparing the further injection molding step between the formation of the basic component and the formation of the soft component comprises moving a core that is associated with the movable mold part to form the second cavity for the soft component.

In other words, the core may have a first position and a second position with respect to its molding nest, the core being involved in both the formation of the basic component and the formation of the soft component. By way of example, the movable core is a component of the movable mold part.

According to an exemplary arrangement, the mold for forming the cover part combines a movable mold part with a movable core in the mold part. In other words, according to this embodiment, two aspects of 2K part manufacturing are combined to form the desired portions of the cover part in a combined cycle.

During a transfer between the formation of the basic component and the formation of the soft component, the basic component is arranged on the movable mold part so that the basic component is moved together with the movable mold part. In this way, excessive deformation of the basic component during transfer can be avoided. This has a beneficial effect on dimensional accuracy and, overall, on the quality of the parts. Furthermore, there is no need for external handling technology to transfer the basic component.

In other words, for example, the front side of the basic component first faces a molding nest for the formation of the basic component and, after the transfer, faces another molding nest for the formation of the soft component. In exemplary arrangements, the soft component is formed at least sectionally on the front side of the basic component. Sections of the soft component, which are formed on the back side of the basic component are in exemplary arrangements unblocked and defined by a core, which is movable in the movable mold part by means of core retraction technology.

In an exemplary arrangement of the cover part or the method, a stroke of the core provides in the second cavity a connection between the nozzle-side molding nest for the soft component and the molding nest of the movable mold part during preparation of the further injection molding step. In other words, the core forms a channel, through which the soft component can extend. This is achieved, for instance, by the core exposing a passage opening in the basic component.

In an exemplary arrangement of the cover part or the method, the movement of the core in the molding nest of the movable mold part forms a channel, which, in a closed state of the second cavity, provides a connection between a sealing lip region of the nozzle-side molding nest for forming a sealing lip and a buffer region formed jointly by both molding nests for forming at least one buffer.

For example, the stroke of the core is 3 mm. This is not to be understood to be limiting. In this exemplary arrangement, the stroke of the core allows on the one hand an inflow of the material of the soft component and on the other hand a distribution between the sealing lip and a buffer area.

Furthermore, the present disclosure relates to a vehicle comprising a cover part according to at least one of the embodiments described herein, wherein the cover part is arranged between a fixed body component and a flap of the vehicle. In certain embodiments, the soft component forms a buffer, which is configured to absorb forces when closing the flap. In this way, excessive forces and impacts on the cover part itself, as well as on adjacent components of the body, can be avoided.

It is to be understood that the previously mentioned features and those mentioned in the following may not only be used in the respectively indicated combination, but also in other combinations or as isolated features without leaving the spirit and scope of the present disclosure.

BRIEF DESCRIPTION OF THE DRAWINGS

Further features and advantages of the present disclosure will be apparent from the following description and explanation of several exemplary embodiments with reference to the drawings, wherein:

FIG. 12: is a schematic, sectional view of a basic component of a further embodiment of a cover part;

FIG. 13: is another view based on FIG. 12 illustrating a movable core;

FIG. 14: is a further view based on FIG. 12 and FIG. 13 illustrating a soft component that is molded onto the basic component to form a buffer region;

FIG. 15: is another view based on FIGS. 12-14 illustrating the movable core, which is also used in the manufacture of the soft component;

EMBODIMENTS

Figure 1:
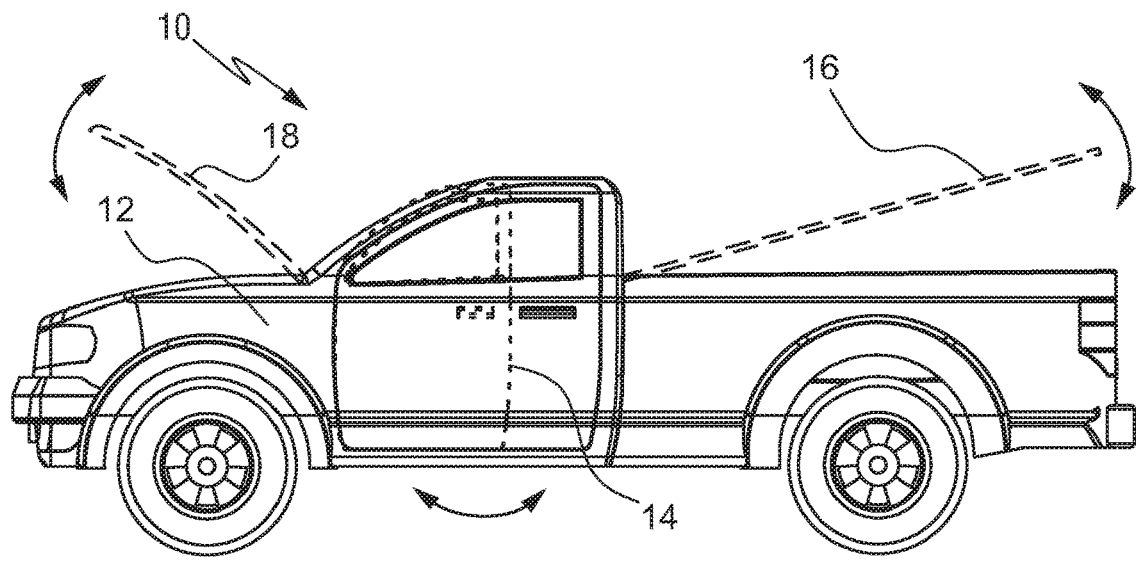
FIG. 1: is a simplified side view of a vehicle with several flaps.

FIG. 1 illustrates, by means of a schematic representation, a vehicle that is designated as a whole by 10. The vehicle 10 comprises a body 12 having various flaps 14, 16, 18. By way of example, the flaps 14, 16, 18 form a movable component of the body 12 and are movable relative to (fixed) body components. The flap 14 is a door. The flap 16 is a load compartment flap. The flap 18 is a hood or bonnet. Other types and embodiments of flaps are nevertheless conceivable. When opening and closing the flaps 14, 16, 18, sometimes quite high forces or even impacts occur. By way of example, this is the case when one of the flaps 14, 16, 18 hits a counterpart without sufficient deceleration. This may occur in case of misuse. However, this can also occur in the case of a technical defect.

Figure 2:
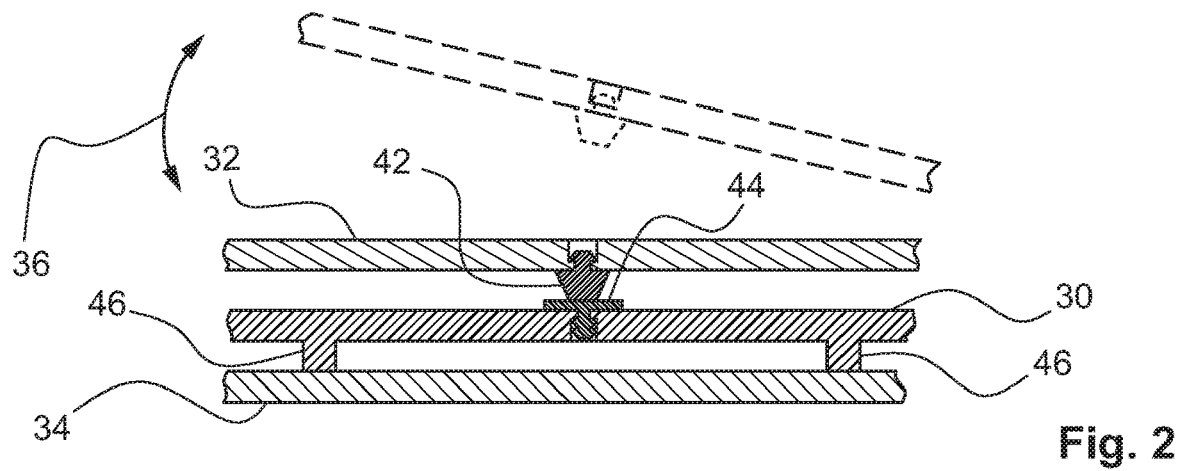
FIG. 2 is a simplified, sectional partial view of an arrangement with a flap and a cover part for illustrating a closing movement.

FIG. 2 illustrates a conceivable structure in the vicinity of such a flap 14, 16, 18 of a vehicle 10. A component designated by 30 forms a cover part (also: trim part). In the exemplary embodiment, the cover part 30 is arranged between a flap 32 and a body-side base 34. In an exemplary embodiment, the cover part 30 serves to cover the body-side base 34. A curved double arrow designated by 36 illustrates, together with a dashed representation, the closing movement of the flap 32 with respect to the cover part 30. In principle, the cover part 30 can also be a component of the flap 32 and be moved together therewith latter with respect to the body-side base 34.

With the arrangement shown in FIG. 2, an impact component in the form of a buffer 44 is provided at the cover part 30. Similarly, an impact component in the form of a buffer 42 is provided on the flap 32. By way of example, the buffers 42, 44 are configured as separate parts that have to be mounted to the cover part 30 and the flap 32. The buffers 42, 44 serve to limit forces and absorb impacts in the event of high loads. The buffers 42, 44 may also serve to provide a desired clearance (gap) between the flap 32 and the body of the vehicle. The buffers 42, 44 are typically formed of flexible materials having sufficiently elastic behavior, such as rubber, silicone, natural rubber, thermoplastic elastomers, and the like. However, the buffers 42, 44 are configured as mounting parts. Furthermore, FIG. 2 shows supports of the cover part 30, designated by 46, which contact the base 34 in the exemplary embodiment.

Figure 3:
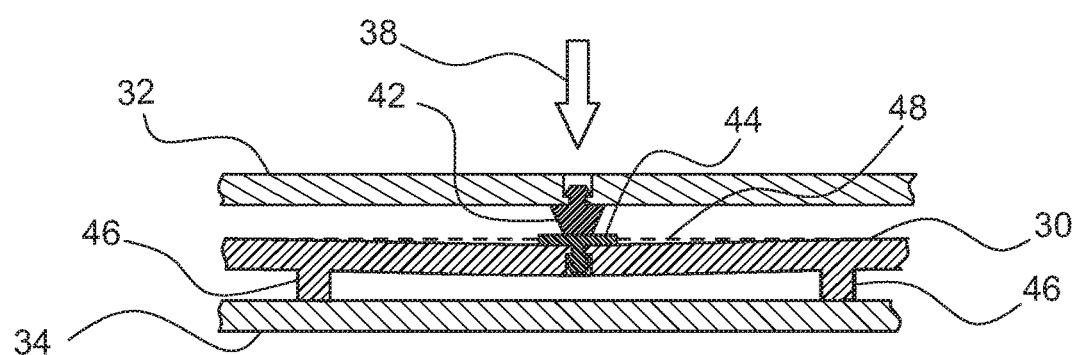
FIG. 3: is another view based on FIG. 2 that illustrates a load condition.

FIG. 3 illustrates, in conjunction with FIG. 2, a load condition, in which a force 38 acts on the buffer 44 and consequently on the cover part 30. A dashed line designated by 48 illustrates a conceivable deformation of the cover part 30 in the case of a correspondingly high force 38. By way of example, the force 38 acts via the flap 32 on the buffer 42 there and via the buffer 42 in turn on the buffer 44 of the cover part 30. In this way, considerable deformations can occur in the cover part 30 and possibly even damage to the cover part 30 or even to the body-side base 34.

Figure 4:
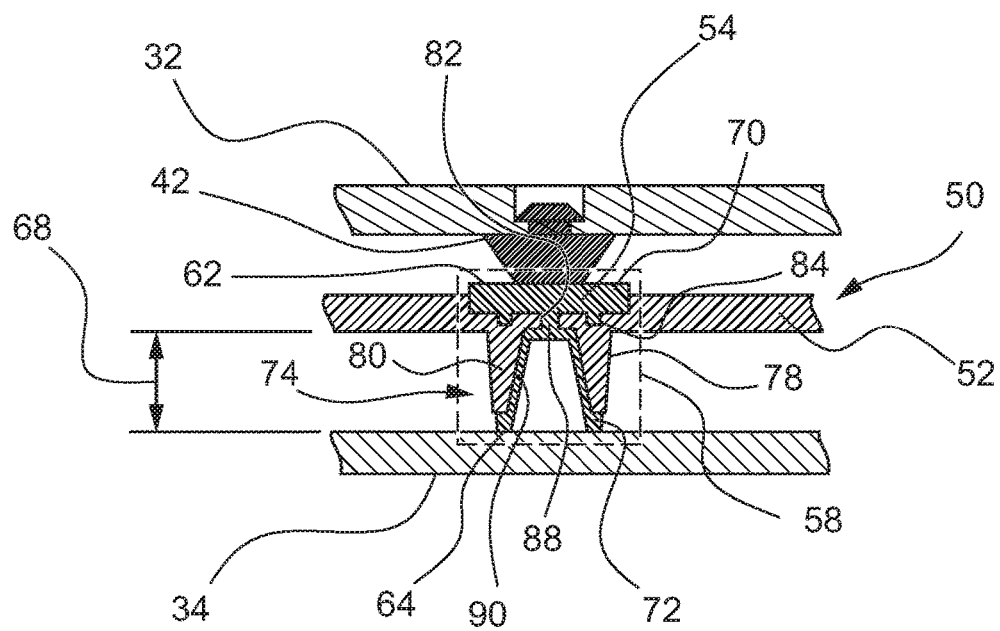
FIG. 4: is a simplified, sectional partial view of an embodiment of a cover part between a flap and a body-side base of a vehicle.

FIG. 4 illustrates, by means of a schematic, cross-sectional partial view, a conceivable arrangement of a cover part that is designated by 50 as a whole, which has two components. The cover part 50 comprises a basic component 52 and a soft component 54. Analogous to the arrangement according to FIGS. 2 and 3, the cover part 50 is arranged between a flap 32 and a body-side base 34. In the exemplary embodiment, the flap 32 is provided with a buffer 42 that serves as an impact component.

With the cover part 50, the soft component 54 now forms a buffer region 58. In this way, the soft component 54 can provide a support surface 62 towards the flap 32 or its buffer 42. In a load condition, the buffer 42 contacts the support surface 62. Similarly, the soft component 54 provides a rear contact surface 64 that contacts the body-side base 34 in a load condition, for example. In other words, the soft component 54 may extend through the basic component 52 in the exemplary embodiment.

In FIG. 4, an arrow 68 illustrates a distance or gap between the basic component 52 (or a thin-walled section thereof) and the body-side base 34. It is generally conceivable that the cover part 50 contacts the body-side base 34 in the buffer region 58 in a neutral state (without external load). It is generally also conceivable that the cover part 50 does not contact the base 34 in the buffer region 58 in a neutral state. Contact would then occur with a correspondingly large load. In such circumstances (relatively large gap 68 as in FIG. 4), it is possible that the basic component 52 towards the body-side base 34 is also provided with a raised contour in order to bridge the gap 68.

The soft component 54 forms a front buffer 70 facing the flap 32 in the exemplary embodiment. The soft component 54 further forms a rear buffer 72 that faces the body-side base 34. A reverse association occurs, for example, when the cover part 50 is a component of the flap 32.

In the exemplary embodiment, the soft component 54 forms a double buffer 74 in the buffer region 58 that includes both the front buffer 70 and the rear buffer 72. The basic component 52 forms a support profile 78, which, in the exemplary embodiment, extends at least partially towards the body-side base 34. The support profile 78 is at least sectionally covered by and fixedly connected to the soft component 54. The support profile 78 includes one or more supporting walls 80 that are formed as raised contours on a back side of the basic component 52.

A passage opening 82 is formed within the support profile 78 that is in the exemplary embodiment arranged rearwardly at the basic component 52. The basic component 52 has one or more recesses 84 on its side facing away from the supporting walls 80. The recesses 84 serve, by way of example, to prevent sink marks and material accumulations in the basic component 52. The recesses 84 also represent form-fit connection elements for a fixed connection between the soft component 54 and the basic component 52.

The soft component 54 extends through the passage opening 82 to form a connection 88 between the front buffer 70 and the rear buffer 72. In the exemplary embodiment, the soft component 54 extends along inner flanks of the supporting walls 80 towards the rear buffer 72 to form there a connection 90 between the front buffer 70 and the rear buffer 72.

In the exemplary embodiment, the front buffer 70 may also be referred to as a support cushion. In the exemplary embodiment, the rear buffer 72 forms a face-sided termination of the supporting walls 80 of the support profile 78. For example, if a high force is applied to the cover part 50 via the buffer 42 of the flap 32, the force is first applied to the front buffer 70. Thus, damage to the basic component 52 is avoided or reduced. In the event of a deflection of the basic component 52, this force and movement is transmitted via the support profile 78 towards the rear buffer 72. The buffer 72 may be compressed or otherwise deflect to absorb the applied force and minimize or prevent possible damage to the body-side base 34 or the cover part 50 itself.

Figure 5:
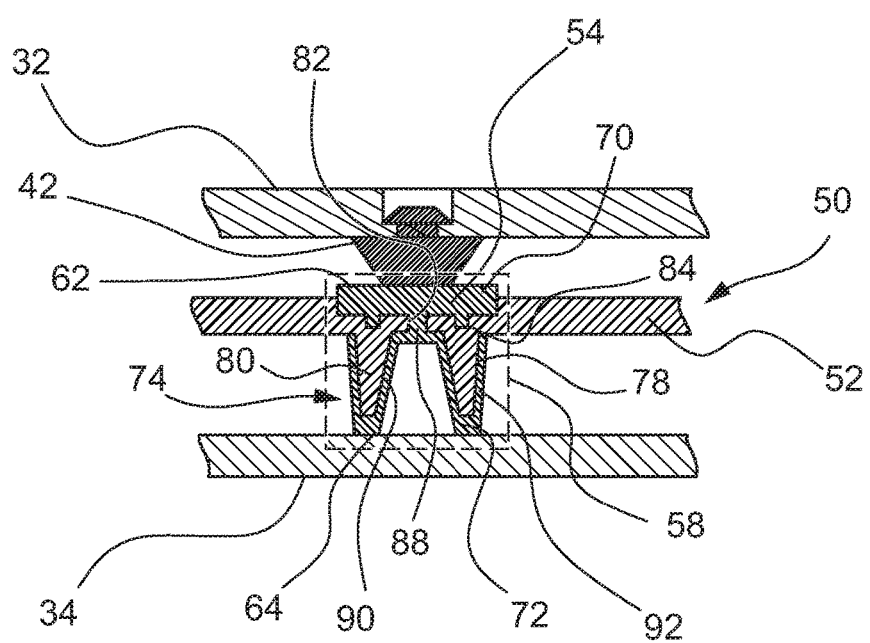
FIG. 5: is a simplified, sectional partial view of an arrangement that is modified compared to FIG. 4.

FIG. 5 illustrates an embodiment of a cover part 50 that is very similar to the embodiment according to FIG. 4. In the exemplary embodiment according to FIG. 5, the soft component 54 extends not only on inner flanks of the supporting walls 80 of the support profile 78, but also at least partially on outer flanks. In the exemplary embodiment, the soft component 54 also forms, at least sectionally, an outer covering 92 of the supporting walls 80. FIG. 5 shows a sectional view. The supporting walls 80 of the support profile 78 in the basic component 52, shown there in cross-section, have a V-shaped sheath by the soft component 54. In this way, the bonding of the rear buffer 72 to the support profile 78 can be increased.

The cover part 50 according to FIGS. 4 and 5 has a double buffer 74 in buffer region 58, respectively, which is formed by the soft component 54. The soft component 54 is integrally bonded to the basic component 52 and extends through a passage opening 82 in the basic component 52. In this way, a buffer 70, 72 can be provided both at a front side and at a back side by one and the same component (soft component 54).

Based on the schematic illustrations shown in FIGS. 4 and 5, FIGS. 6-11 illustrate aspects and embodiments of an exemplary embodiment of a cover part 50. The cover part 50, shown in FIGS. 6-11 in only partially, utilizes the principles schematically illustrated with reference to FIGS. 4 and 5.

Figure 6:
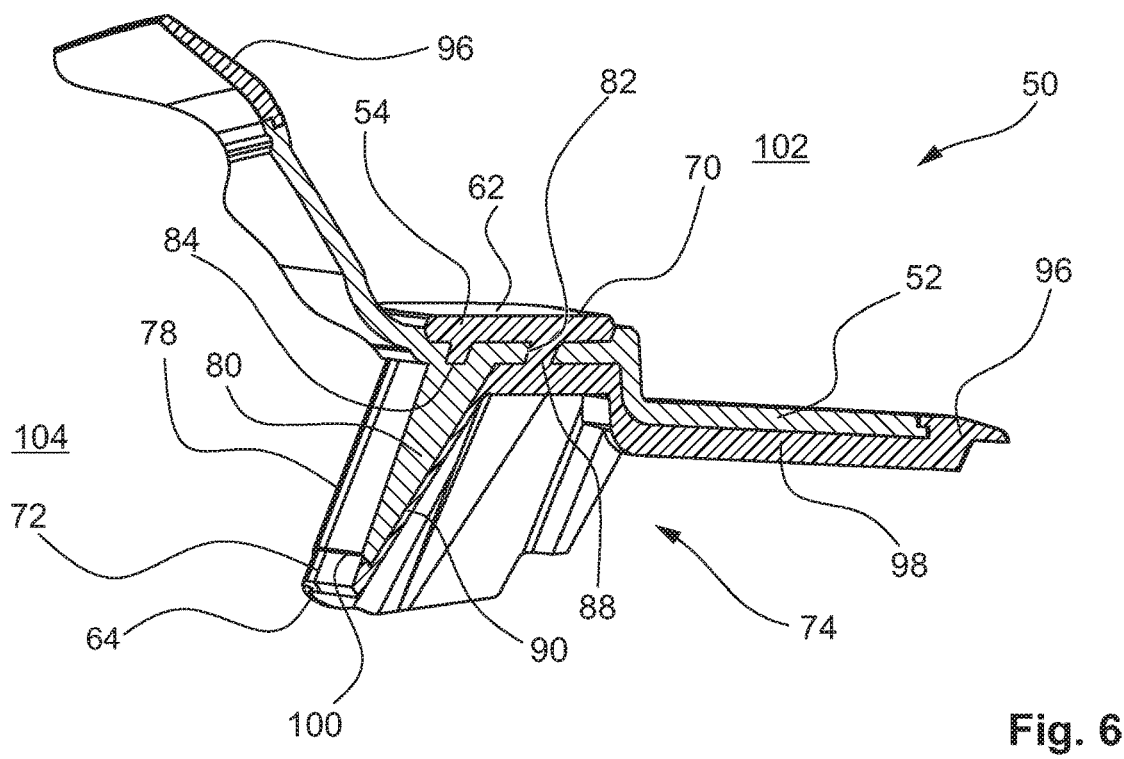
FIG. 6: is a perspective, sectional partial view of a further embodiment of a cover part comprising a basic component and a soft component.
Figure 7:
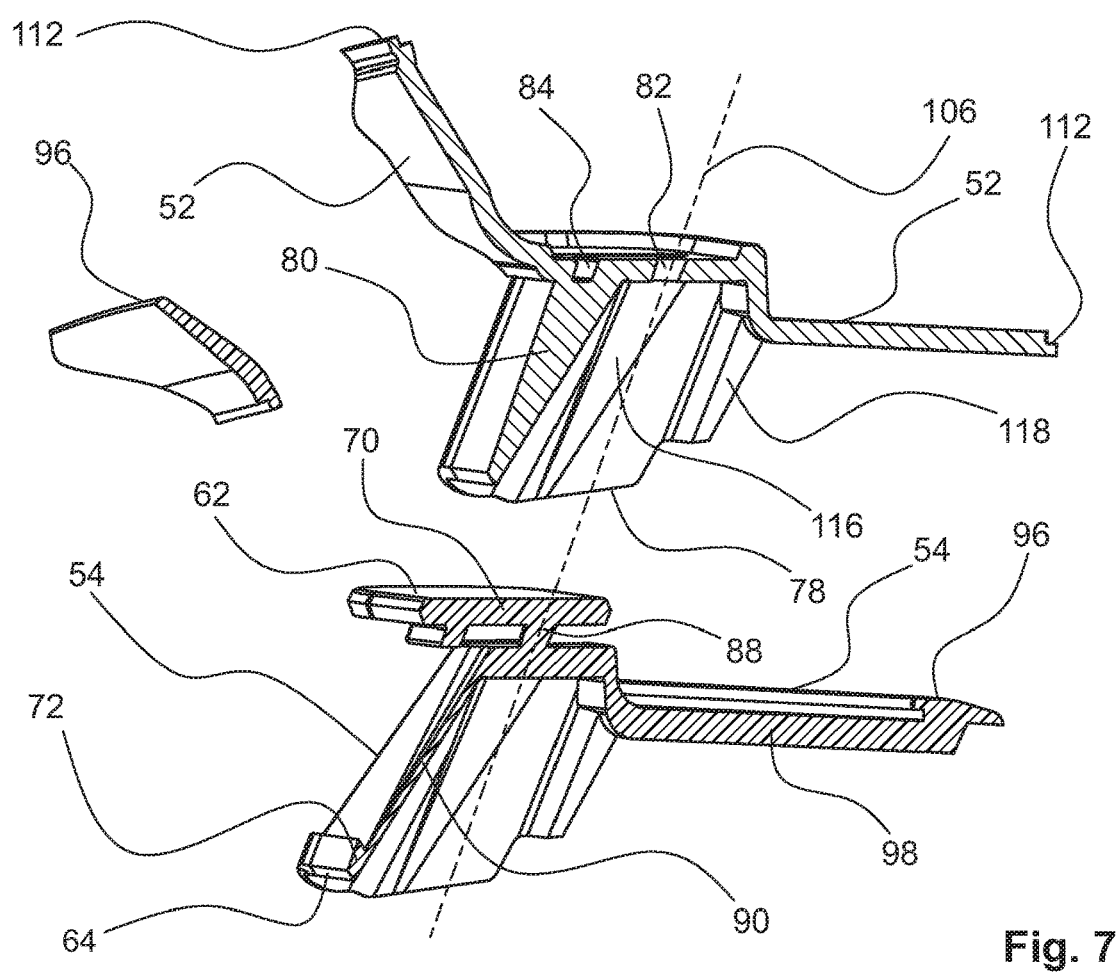
FIG. 7: is a further view of the cover part according to FIG. 6 in an exploded state to illustrate the individual components.

FIG. 6 illustrates a perspective, cross-sectional partial view of the cover part 50, showing a basic component 52 made of a first material and a soft component 54 made of a second material. FIG. 7 illustrates an exploded view, in which the basic component 52 and the soft component 54 are separated from each other. It will be understood that, for instance in the case of integral manufacture of the basic component 52 and the soft component 54 by means of 2K injection molding, the state shown in FIG. 7 does not correspond to any specific manufacturing step, because the basic component 52 and the soft component 54 are manufactured integrally and are thereby firmly connected to one another. FIGS. 8-11 illustrate various detailed views, with the soft component 54 being respectively in a sectional view to illustrate its arrangement with respect to the basic component 52.

The material of the basic component 52 is, for example, a thermoplastic material, such as PP, PA, and the like. It is conceivable to add other materials, for example for reinforcement or to optimize certain properties. The material of the basic component 52 can be processed by injection molding. By way of example, the material of the soft component 54 is a thermoplastic elastomer, i.e., a thermoplastic material with elastic properties, for example TPE. The material of the soft component 54 is processable by injection molding. Since both components 52, 54 comprise materials that can be processed by injection molding, in certain embodiments, a combined production in only one injection molding tool for multi-component injection molding is possible.

In FIG. 6, reference numeral 102 illustrates a front side. The reference sign 104 illustrates a back side of the cover part 50. At the front side 102, the soft component 54 forms a support surface 62 that is part of a front buffer 70 in the exemplary embodiment. At the back side 104, the soft component 54 forms a contact surface 64 that is part of a rear buffer 72. The soft component 54 thus forms a double buffer 74, which is present both at the front side 102 and at the back side 104.

In a generally previously described manner, the basic component 52 forms a support profile 78 with supporting walls 80. The support profile 78 extends as a raised contour on the back side 104 of the basic component 52. Within the support profile 78, the basic component 52 includes a passage opening 82 that provides a connection 88 for the soft component 54 between the front side 102 and the back side 104.

FIGS. 6, 7, 9 and 11 further illustrate a recess 84 formed in the basic component 52 on the front side 102. The recess 84 avoids sink marks and material buildup in the area of the basic component 52, to which the supporting walls 80 of the support profile 78 are adjacent. Additionally, the recess 84 provides a form-fitting contour for the soft component 54. The exploded view in FIG. 7 further shows the arrangement of the soft component 54 in the region of the connection 88 through the passage opening 82. The passage opening 82 is filled by the soft component 54 to provide a connection 88 between the front buffer 70 and the rear buffer 72.

Furthermore, FIGS. 6 to 11 show that the soft component 54 lines the supporting walls 80 of the support profile 78 from the inside, at least sectionally, and creates there a connection 90 between the front side 102 and the back side 104. Consequently, material can flow between the front side 102 and the back side 104 via the connections 88, 90 during manufacture of the soft component 54. In this way, the soft component 54 can form both the front buffer 70 and the back buffer 72. When a core is used in the injection mold to form a molding nest for the soft component 54 in the support profile 78, the thickness of the soft material 54 in the connection 90 is dependent on a given inclination of the support profile 78 or its support wall 80 and on the stroke of the core.

FIGS. 6 and 7 further illustrate a sealing lip 96 formed by the soft component 54 and enclosing the basic component 52, at least sectionally. The sealing lip 96 is connected to the double buffer 74, which is also formed by the soft component 54, via a connection 98. In certain embodiments, the connection 98 connects the sealing lip 96 to an inner region of the support profile 78. The connection 98 extends on the back side 104 of the basic component 52. A component of the mold (for example a movable core) arranged there may provide a space in the cavity, in which the soft component 54 extends on the back side 104. When this is done using a movable core, the same molding nest (mold half) can be used to form the back side 104 of both the basic component 52 and the soft component 54.

Figure 8:
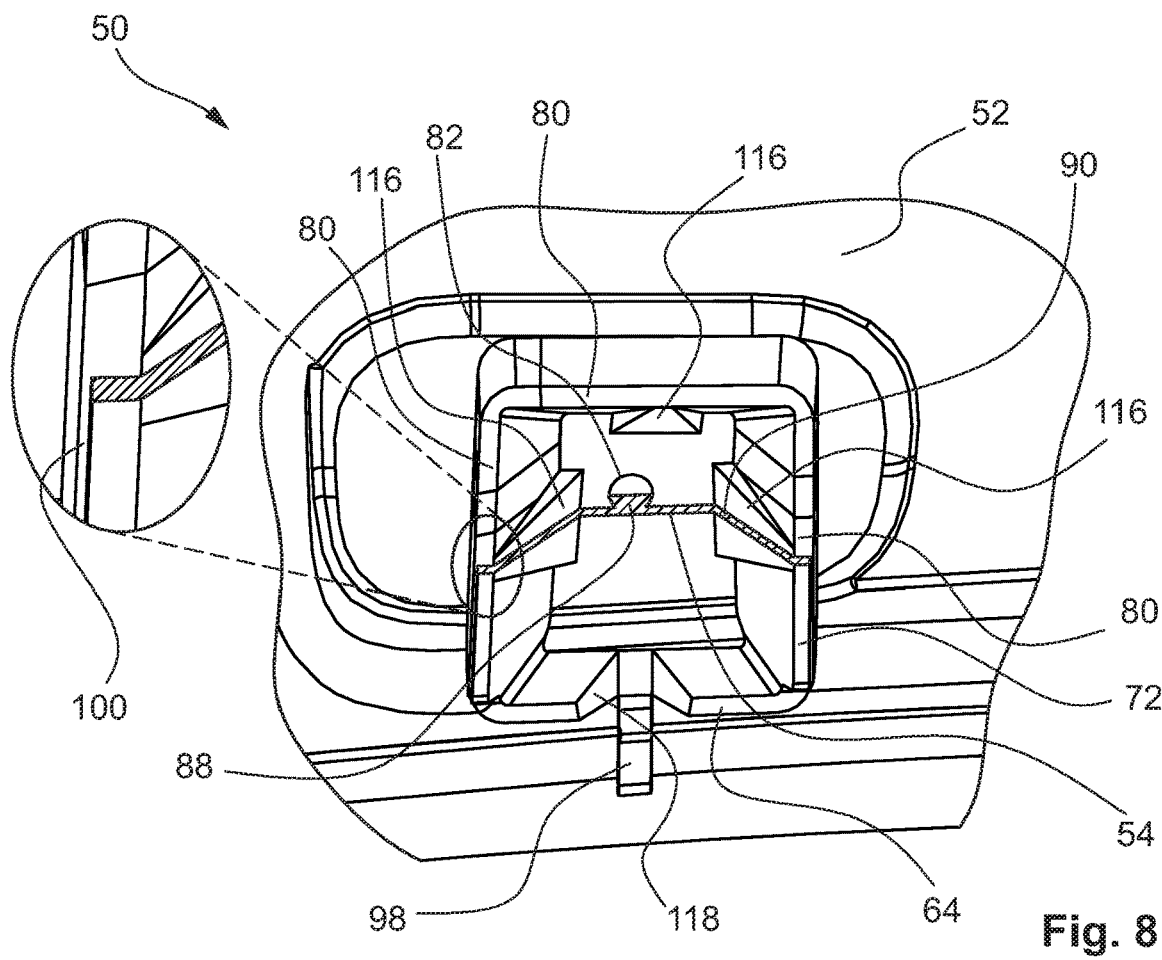
FIG. 8: is a rear, partially cross-sectional partial view of an embodiment of a cover part based on the arrangement according to FIGS. 6 and 7, from the back side.

FIG. 6 and FIG. 8 (including an enlarged view of a section of the support profile 78) illustrate a projection 100 between the walls 80 of the support profile 78 and the soft component 54, which forms the rear buffer 72 there. Thus, in the exemplary embodiment, the buffer 72 is not configured flush with outer flanks of the supporting walls 80. A flush termination may increase the risk of material pushing past the edge of the walls 80 during the formation of the soft component 54.

In FIG. 7, a dashed line designated by 106 illustrates the main demolding direction. The main demolding direction 106 is also the direction, in which a core in the mold, which defines on the one hand—at least sectionally—an inner contour of the support profile 78 and on the other hand—at least sectionally—the contour of the material of the soft component 54 formed on/in the support profile 78, is moved in a molding nest of the mold in order to create space for the soft component 54. The stroke of the core along the main demolding direction 106 results, for example, in the thickness of the soft component 54 in the region of the connection 90, which covers inner flanks of the walls 80 of the support profile 78.

FIG. 7 further illustrates at 112 a perimeter of the basic component 52. The sealing lip 96 is arranged at the perimeter 112 of the basic component 52. The sealing lip 96 may partially or completely enclose the perimeter 112 of the basic component. By way of example, the sealing lip 96 is defined by a molding nest that provides a corresponding space on the front side 102, in which the soft component 54 can extend. The sealing lip 96 is connected to the front buffer 70 and to the rear buffer 72 via the connection 98.

Figure 10:
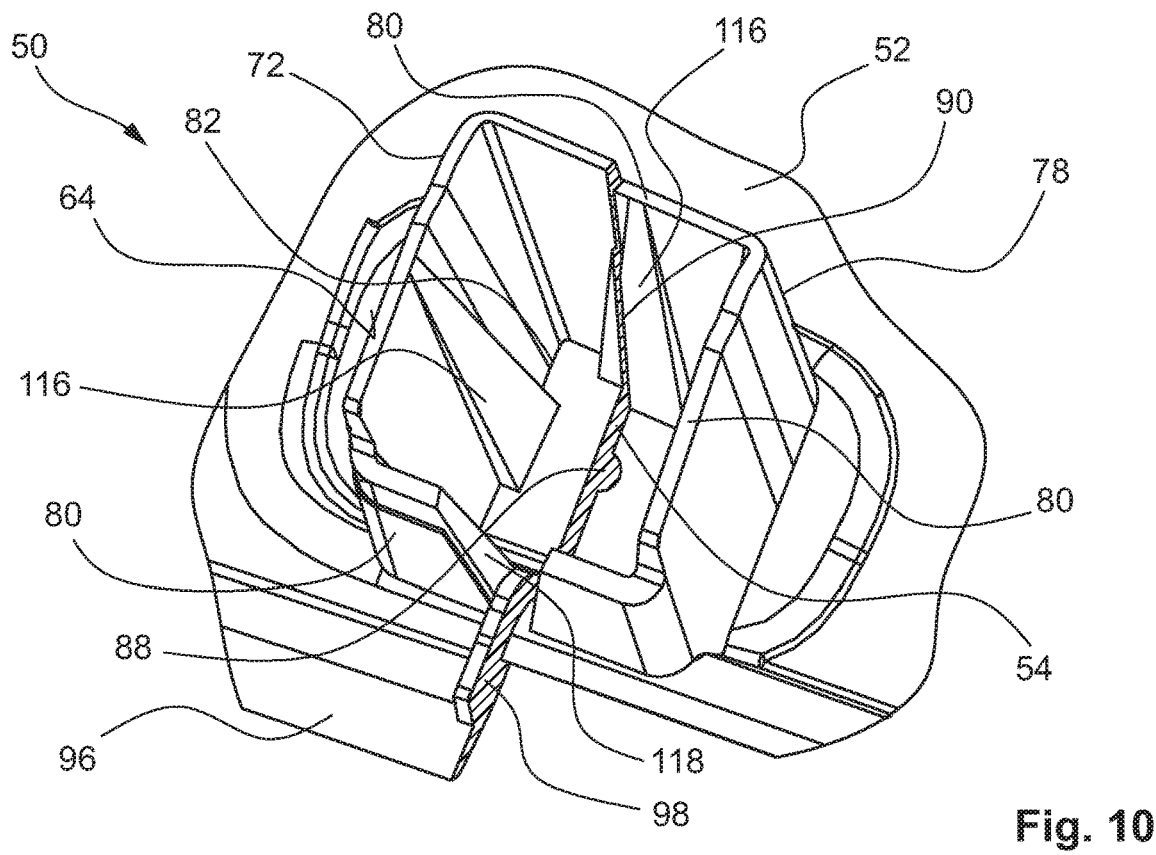
FIG. 10: is another view of the cover part according to FIG. 8 and FIG. 9 with modified orientation and modified sectional plane, from the back side.

FIGS. 7, 8 and 10 further show sections of the supporting walls 80 of the support profile 78 that are designated by 116. The sections 116 have an inclined configuration, i.e., are more significantly inclined relative to the main demolding direction 106 than the supporting walls 80. By way of example, the supporting walls 80 generally have an inclination (demolding inclination) of 2° relative to the main demolding direction 106. By way of example, the inclined sections 116 have an inclination of 15° with respect to the main demolding direction 106. In certain embodiments, an effect of this arrangement is that the connection 90 formed by the soft component 54 has an increased wall thickness along the inner flanks of the supporting walls 80 in the region of the sections 116. In this way, sufficient material can flow between the front side 102 and the back side 104 during manufacturing.

FIGS. 7, 8, 10 and 11 further illustrate a lateral opening 118 in the support profile 78. By way of example, the support profile has a generally U-shaped or C-shaped cross-section as viewed along the main demolding direction 106, with the opening 118 providing access to the interior of the support profile 78. Through the opening 118, the connection 98 extends between the sealing lip 96 and the double buffer 74 with the front buffer 70 and the rear buffer 72. In the region of the opening 118, a core in the tool, which is moved along the main demolding direction 106, can provide a channel for the soft component 54 so that a connection between the sealing lip 96 and the double buffer 74 is formed. In this way, different multi-component injection molding technologies can be combined to form the sealing lip 96 and the double buffer 74 with the same soft component 54.

Figure 9:
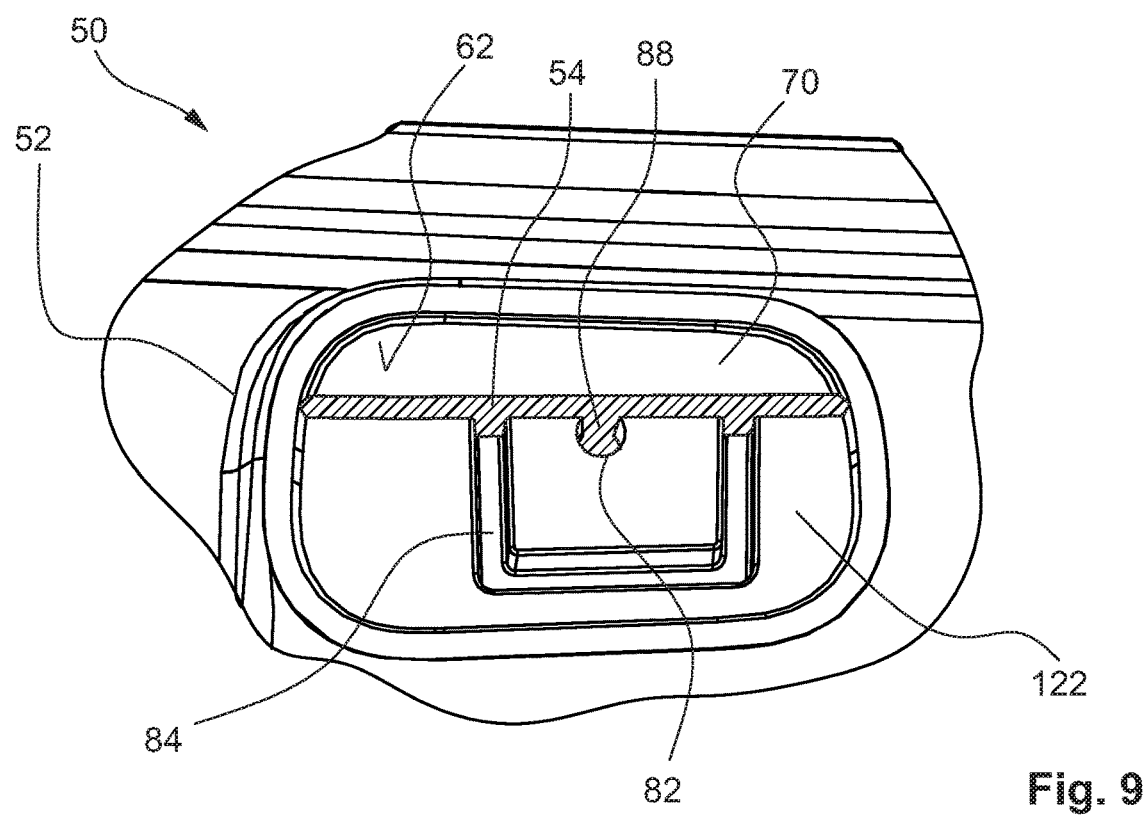
FIG. 9: is another view of the cover part according to FIG. 8 with modified orientation, from the front side.
Figure 11:
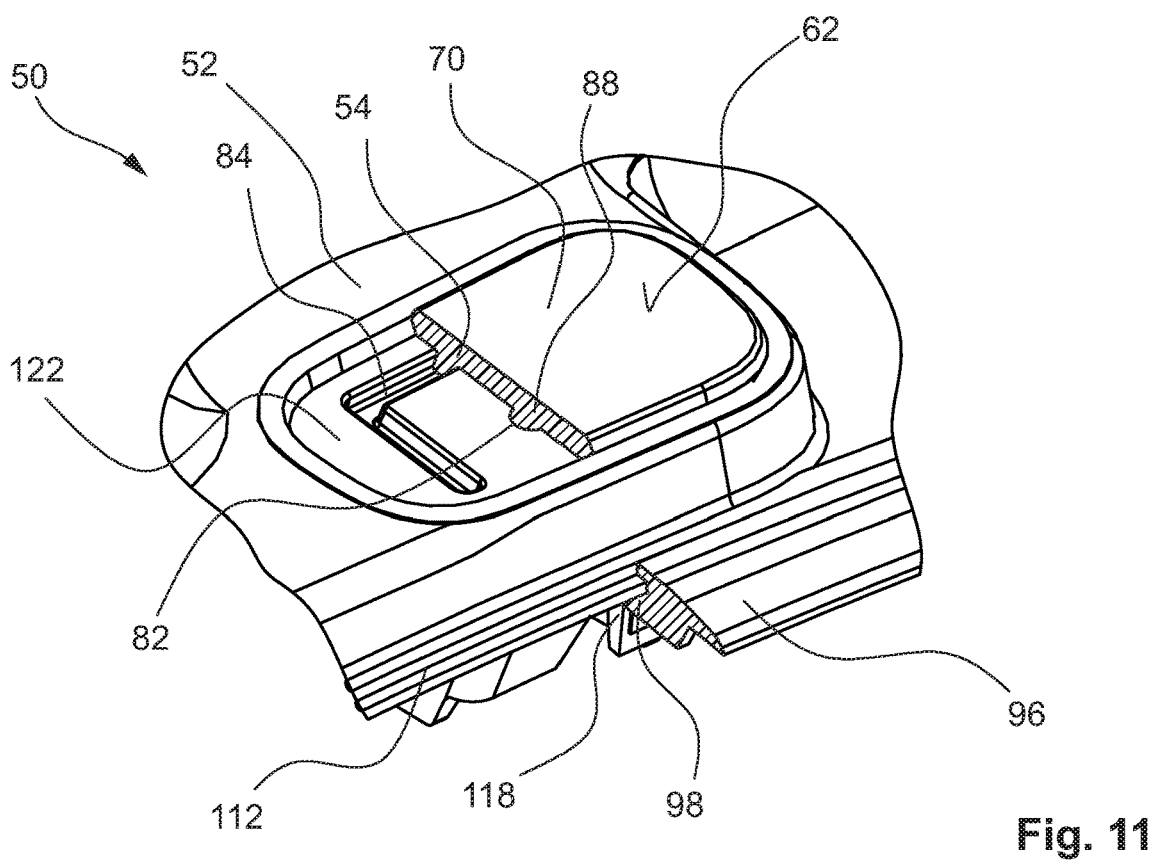
FIG. 11: is a further view of the cover part according to FIGS. 8-10 with modified orientation, from the front side.

In addition to the previous embodiments, FIGS. 9 and 11 illustrate a seat 122 for the front buffer 70. In the exemplary embodiment, the front buffer 70 is seated in a recessed seat 122. The soft component 54 also fills the recess 84 in the basic component within the seat 122. Further, passage opening 82 is formed in seat 122 to create connection 88 between front side 102 and back side 104.

Figure 16:
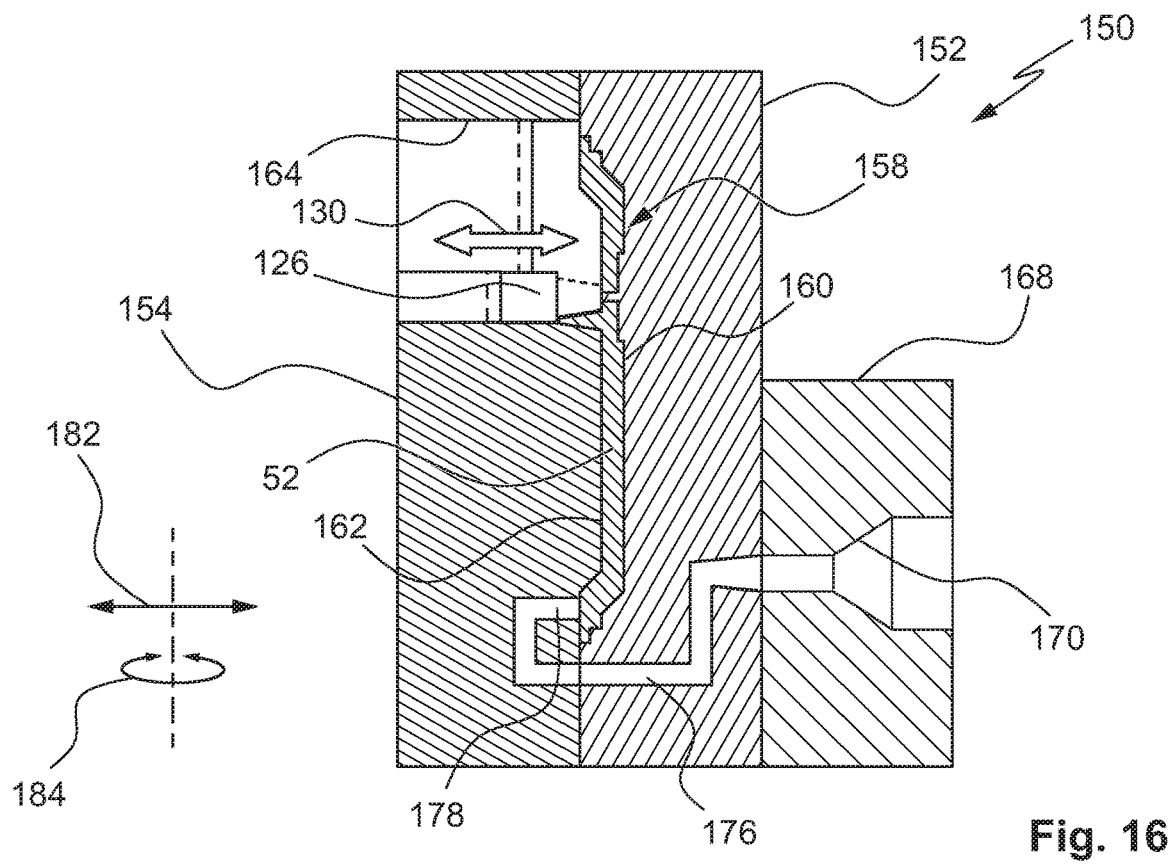
FIG. 16: is a schematic, highly simplified sectional view of an injection mold in a state for forming a first basic component of a cover part.
Figure 17:
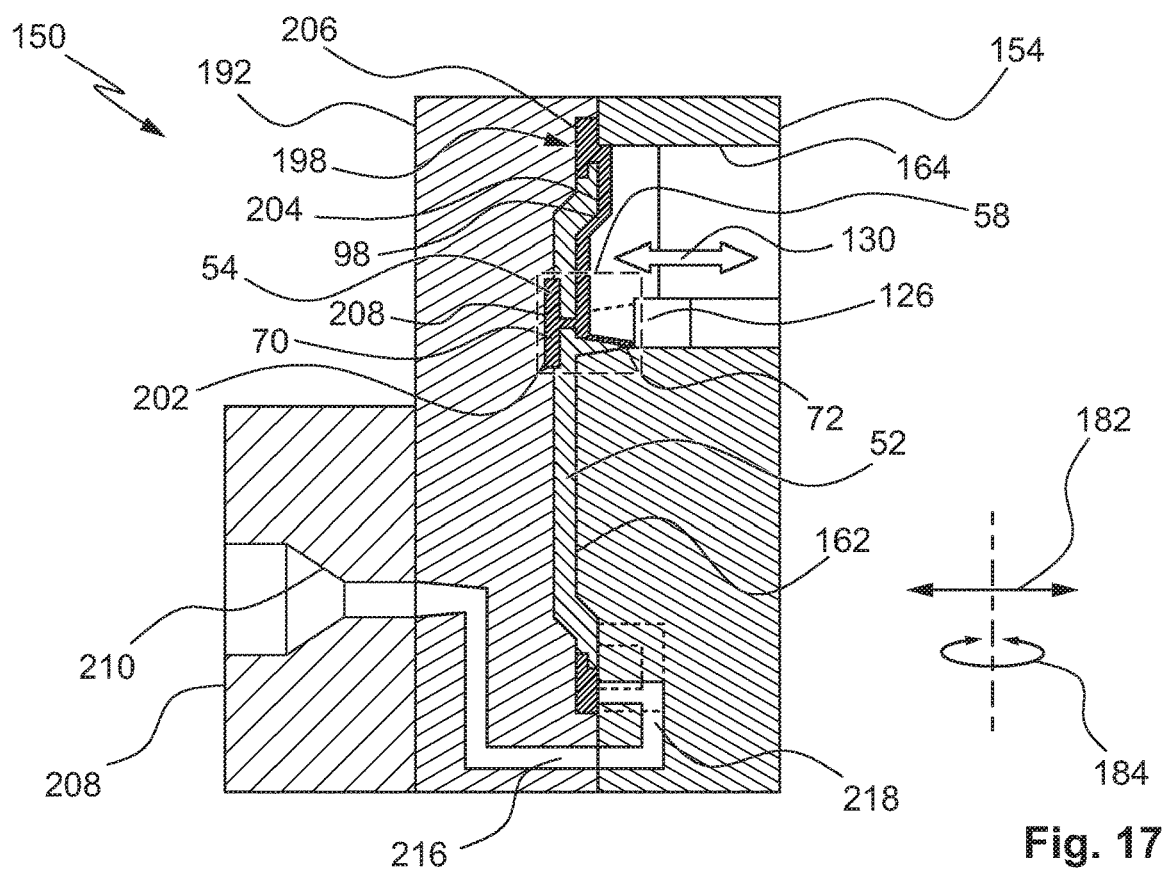
FIG. 17: is a further schematic, highly simplified sectional view of the injection mold according to FIG. 17 in a state for forming a soft component of the cover part, which is molded onto the basic component.

With reference to FIGS. 12-15, and with supplementary reference to FIGS. 16 and 17, an exemplary approach to the manufacture of the cover part 50 is illustrated on the basis of schematic representations. FIG. 12 shows the basic component 52 of the cover part 50 in a single position. FIG. 14 shows a schematic sectional view of the cover part 50 that is formed by the basic component 52 and the soft component 54 with the buffer region 58 that is firmly bonded thereto.

The basic component 52 according to the schematic illustration shown in FIG. 12 comprises a thin-walled, areal extension defining a front side 102 and a back side 104. A support profile 78 with supporting walls 80 is formed on the back side 104. In the region of the support profile 78, a passage opening 82 extends between the front side 102 and the back side 104. The support profile 78 is partially open, compare the opening 118, which is not cut in the view orientation according to FIG. 12. Furthermore, a perimeter 112 of the basic component 52 is indicated, which delimits the front side 102 and the back side 104 from each other. Furthermore, FIG. 12 shows a seat 122 on the front side 102, in which the front buffer 70 of the soft component 54 is later formed.

FIG. 13 illustrates an embodiment of the basic component 52 that is based on FIG. 12. It is shown there that a movable core 126 can be used to form a portion of the rear contour of the basic component 52. The core 126 is part of a molding nest that is used to form the basic component by injection molding.

FIG. 14 is based on the illustration in FIG. 12 and shows the cover part 50 with the soft component 54, which is firmly connected to the basic component 52. The soft component 54 forms the buffer area 58 in the area of the support contour 78. In this way, a support surface 62 is formed on the front side 102. Furthermore, a contact surface 64 is formed on the back side 104. By way of example, the soft component 54 forms a double buffer 74 there, which comprises a front buffer 70 and a rear buffer 72. The soft component 54 thus extends between the front side 102 and the back side 104, for instance via a connection 88 through the passage opening 82.

FIG. 15 is based on the illustration in FIG. 13, whereby the movable core 126 has now been moved (compare stroke 130) in order to create space for the soft component 54 on the back side 104 of the basic component 52. The movable core 126, which previously formed at least a section of the support contour 78 of the basic component 52, provides sufficient space on the back side 104 of the basic component 52 for the formation of the soft component 54. As the core has been moved in accordance with the stroke 130, the soft component 54 may attach to the supporting walls 80 of the supporting contour 78, compare the connection 90. Further, a connection 98 may be formed between the buffer region 58 and the sealing lip 96 that at least sectionally surrounds the perimeter 112 of the basic component 52. In certain embodiments, the connection 98 extends through the opening 118 of the support profile 78.

Thus, the same movable core 126 can be used to form a section of the basic component 52 and a section of the soft component 54. In this way, the same mold part can provide a molding nest (mold half) for both the basic component 52 and the soft component 54.

FIGS. 16 and 17 illustrate, by means of a schematic representation, an embodiment of a mold 150 that is suitable for manufacturing the cover part 50. For further illustration, reference is made to the schematic design of the cover part 50 according to FIGS. 12-15. The mold 150 is suitable for forming the cover part 50 by means of multi-component injection molding (2K technique).

The mold 150 includes a mold part 152, which is referred to as the nozzle side, by way of example. Further, an opposing movable mold part 154 is provided. The mold parts 152, 154 collectively form a cavity 158 for forming the basic component 52 of the cover part 50. The mold part 152 provides a molding nest 160 that defines the front side 102 of the basic component 52, compare FIGS. 12 and 13. The mold part 154 provides a molding nest 162 that defines the back side 104 of the basic component 52. Together, the molding nests 160, 162 form the cavity 158 for the basic component 52.

The mold part 154 houses the movable core 126, which has already been discussed in connection with FIGS. 13 and 15. The core 126 is seated in a guide 164. In FIG. 16, the core 126 is in an advanced position. A direction of movement (stroke) for the core 126 within the mold part 154 is indicated by 130. The stroke 130 allows the core to provide a space within the mold part 154 of the mold 150 during both the formation of the basic component 52 and the formation of the soft component 54.

In the exemplary embodiment, an extruder 168 that includes a nozzle 170 is associated with the mold part 152 (nozzle side). Material for the basic component 52 is introduced into the mold 150 via the nozzle 170. The material flows along a channel 176 towards a sprue 178, which opens into the cavity 158. In the exemplary embodiment shown in FIG. 16, the sprue 178 is not on the nozzle side (mold part 152). This is not to be understood to be limiting.

By way of example, the movable mold part 154 is configured as a rotatable tool. In FIGS. 16 and 17, arrows 182, 184 illustrate possible degrees of freedom of movement of the movable mold part 154. The arrow 182 illustrates a linear feed movement. The arrow 184 illustrates a rotational movement. Other configurations are conceivable, such as rotation about a horizontally oriented axis.

Based on the configuration shown in FIG. 16, the mold 150 can be used to form the basic component 52, compare FIGS. 12 and 13. Based on the configuration shown in FIG. 17, the mold 150 can be used to form the soft component 54, compare FIGS. 14 and 15.

FIG. 17 shows the movable mold part 154 in a state rotated, for example, by 180°. The movable mold part 154 faces a mold part 192, which may also be referred to as the nozzle side for the soft component 54. The mold parts 154, 192 together form a cavity 198 for forming the soft component 54 of the cover part 50. The mold part 192 provides a molding nest 202 that defines the front side 102 of the soft component 54, compare FIGS. 14 and 15. The mold part 154 provides a molding nest 162 that defines the back side 104 of the soft component 54. The molding nests 162, 202 together with the basic component 52 form the cavity 198 for the soft component 54.

In the mold part 154, the movable core 126 in FIG. 17 is offset towards the back side 104 (stroke 130), compared to the illustration in FIG. 16. In this way, the core 126 forms space for the buffer region 58, in which the front buffer 70 and the rear buffer 72 are formed.

The return stroke of the core 126 within the mold part 154, and the corresponding adjustment of the molding nest 162 and the opposing molding nest 202 of the mold part 192, allows the front buffer 70 to be formed on the front side 102 and the rear buffer 72 to be formed on the back side 104. The return stroke of the core 126 further provides a channel 204 for creating a connection 98 between the buffer region 58 and the sealing lip 96 (compare FIG. 13 and FIG. 15). The sealing lip 96 is defined in the molding nest 202 of the cavity 198 by a sealing lip region 206. On the front side 102 of the basic component 52, the molding nest 202 of the mold part 192 provides a buffer volume 208 for the front buffer 70.

In the exemplary embodiment, an extruder 208 that includes a nozzle 210 is associated with the mold part 192 (nozzle side). Material for the soft component 54 is introduced into the mold 150 via the nozzle 210. The material flows along a channel 216 towards a sprue 218, which opens into the cavity 198. In the exemplary embodiment shown in FIG. 16, the sprue 218 is not on the nozzle side (mold part 192). This is not to be understood to be limiting.

In summary, the mold 150 concept illustrated in FIGS. 16 and 17 can provide a cover part 50, in which a combination of a movable core 126 and a movable mold part 154 provides a soft component 54 that forms on the one hand a sealing lip 96 and on the other hand a buffer region 58 having a double buffer 74.

Figure 18:
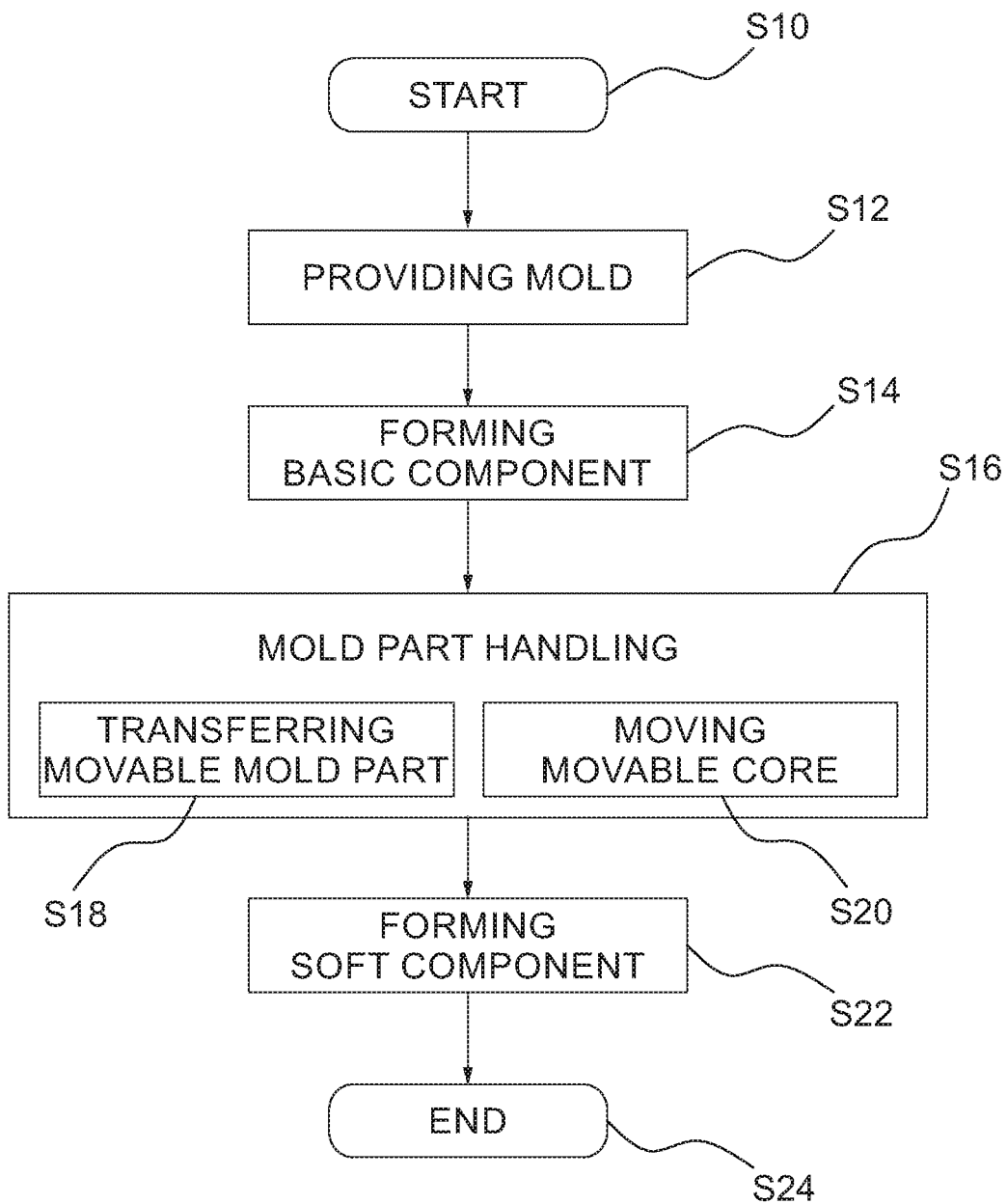
FIG. 18: is a simplified block diagram illustrating an exemplary arrangement of a method for manufacturing a cover part for a vehicle by means of multi-component injection molding.

With reference to FIG. 18, based on a simplified block diagram, an exemplary embodiment of a method for producing a trim part (cover part) for a vehicle is illustrated. The method begins in the exemplary embodiment with a step S10 and ends with a step S24.

A step S12 follows, which relates to the provision of a mold, for instance a mold that is capable of producing components by means of 2K technology. By way of example, the mold comprises a movable mold part (for example, a rotary tool), which can be coupled to a mold part for forming a first component and (after a movement) to a mold part for forming a second component.

This is followed in a step S14 by the formation of a basic component. In certain embodiments, this is a component made of a thermoplastic material. This takes place in a cavity, which is partially defined by the movable mold part.

This is followed by an intermediate step S16, which may also be referred to as a mold part handling step. In the exemplary embodiment, step S16 comprises sub-steps S18, S20. The sub-step S18 relates to a transfer of the movable mold part, for example a rotation. In this way, a molding nest in the movable mold part can be moved towards another molding nest in a mold part for the formation of the soft component. During step S18, the movable mold part carries the previously formed basic component and moves it from a first cavity into a second cavity.

The sub-step S20 refers to the movement of a movable core within the movable mold part. In this way, an additional space for the soft component can be formed, for example on a back side of the trim part to be formed. The movable core is thus lifted, for example, from the basic component already formed in step S14, in order to create space for the soft component. This concerns, for example, a back side of the basic component.

This is followed by step S22, which relates to the formation of the soft component. By coupling the movable mold part with another molding nest, a cavity for the soft component is formed. Due to the measures in steps S18 and S20, on the one hand a partially circumferential sealing lip can be formed. Furthermore, a buffer region with a front buffer and a rear buffer can additionally be formed.

What is claimed is:

1. A cover part for a vehicle, comprising:
    a basic component at least sectionally flat and made of a thermoplastic material, and
    a soft component made of a thermoplastic elastomer, which is firmly connected to the basic component,
    wherein the basic component comprises a front side and a back side,
    wherein the soft component forms at least one buffer that is an impact buffer, which is configured as a double buffer including a front buffer arranged on the front side and a rear buffer arranged on the back side,
    wherein the basic component has an elevated support profile extending on the back side,
    wherein the soft component forms a support surface on the front side, which is part of the front buffer,
    wherein the soft component extends along the support profile towards the back side, and
    wherein the soft component forms a contact surface on the back side, which is part of the rear buffer.

2. The cover part of claim 1,
    wherein the contact surface faces a base that is provided on a body-side of the vehicle.

3. The cover part of claim 1,
    wherein the basic component and the soft component are integrally manufactured in a 2K process.

4. The cover part of claim 1,
    wherein the at least one buffer is configured to absorb forces when a flap of the vehicle is closed.

5. The cover part of claim 1,
    wherein the front buffer is configured to be contacted by an opposite impact component in a load condition.

6. The cover part of claim 5,
    wherein in the case of a limit load on the front buffer, the soft component is configured to be deflected with the contact surface towards a base that is provided on a body-side of the vehicle.

7. The cover part of claim 1,
    wherein the basic component has, between the front side and the back side, at least one passage opening, through which the soft component extends to form a first connection between the support surface and the contact surface, and
    wherein the passage opening is arranged below the support surface of the soft component on the front side.

8. The cover part of claim 1,
    wherein the soft component further forms a sealing lip extending at least sectionally along a perimeter of the basic component.

9. The cover part of claim 8,
    wherein the soft component further forms a second connection between the sealing lip and the contact surface on the back side of the basic component.

10. The cover part of claim 1,
    wherein the support profile comprises a plurality of connected supporting walls extending from the basic component towards the back side, and
    wherein the support profile is demoldable in a main demolding direction.

11. The cover part of claim 10,
    wherein the interconnected supporting walls form an open support profile, which extends from the basic component towards the back side, and
    wherein the open support profile has a slot-like opening, through which the soft component extends.

12. The cover part of claim 11,
    wherein the soft component extends within the support profile and forms a rear termination of the supporting walls for forming the contact surface.

13. The cover part of claim 12,
    wherein the soft component on the back side extends outside the support profile.

14. The cover part of claim 10,
    wherein at least one of the supporting walls comprises a section with increased inclination.

15. A vehicle having a cover part,
    wherein the cover part is integrally formed and comprises:
    a basic component at least sectionally flat and made of a thermoplastic material, and
    a soft component made of a thermoplastic elastomer, which is firmly connected to the basic component,
    wherein the basic component comprises a front side and a back side,
    wherein the soft component forms at least one buffer that is an impact buffer, which is configured as a double buffer including a front buffer arranged on the front side and a rear buffer arranged on the back side,
    wherein the basic component has an elevated support profile extending on the back side, wherein the soft component forms a support surface on the front side, which is part of the front buffer, wherein the soft component extends along the support profile towards the back side, wherein the soft component forms a contact surface on the back side, which is part of the rear buffer, wherein the cover part is arranged between a fixed body component and a flap of the vehicle, wherein the buffer is configured to absorb forces when the flap is closed, wherein the rear buffer faces the fixed body component that is provided on the body side, and wherein the front buffer faces the flap.

\* \* \* \* \*